(No Model.)
A. C. EVANS.
FERTILIZING ATTACHMENT FOR CORN PLANTERS.
No. 247,815. Patented Oct. 4, 1881.
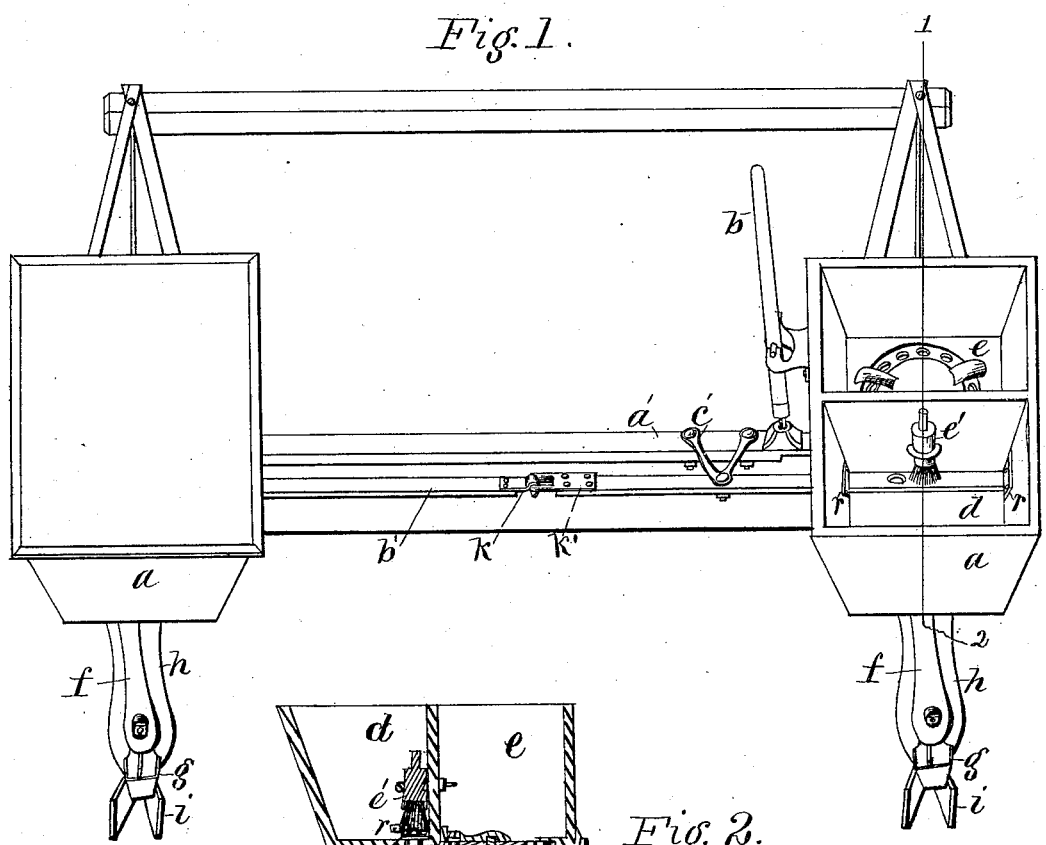
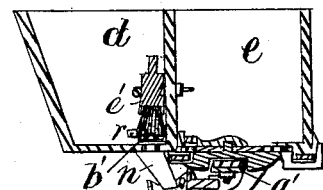
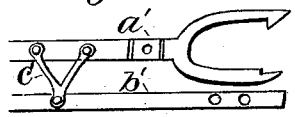
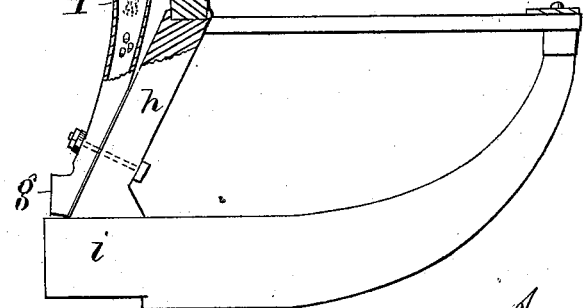
Attest,
M. M. Converse
Ora Converse
Inventor.
Austin C. Evans.
B. C. Converse, atty

UNITED STATES PATENT OFFICE.

AUSTIN C. EVANS, OF SPRINGFIELD, OHIO.

FERTILIZING ATTACHMENT FOR CORN-PLANTERS.

SPECIFICATION forming part of Letters Patent No. 247,815, dated October 4, 1881.

Application filed May 28, 1881. (No model.)

*To all whom it may concern:*

Be it known that I, AUSTIN C. EVANS, of the city of Springfield, in the county of Clarke and State of Ohio, have invented a new and useful Improvement in Fertilizing Attachments for Corn-Planters, which is set forth in the following specification.

My invention relates to that class of corn-planters in which a rotary seed-dropping device is used; and it consists, first, in the use of a double seed-hopper, there being two compartments therein, one behind the other. The forward compartment is intended for the corn and the rear one for the fertilizer.

The object of my invention is to drop the fertilizer into the seed-valve at the same time with the corn, so that they may both be deposited together into the furrow; and to accomplish this I use an additional slide-bar for the rear compartment containing the fertilizer, having two cells in it, through which the compound passes into the seed-valve. The slide-bar is a plain flat bar like that formerly used for dropping corn, and in addition thereto a brush is also used to facilitate the filling and discharge of the fertilizer from its hopper. The slide-bar is coupled together in the middle, so as to allow of its being removed easily, being in two sections. Near to the seed-hopper (just inside of the point where the hand-lever is inserted in the slide-bar actuating the rotary seed-disks) the two slide-bars are rigidly connected together by a forked brace, the two limbs of which are bolted to the seed slide-bar, and the angle end is bolted to the fertilizer slide-bar. This connection allows both slide-bars to receive the actuating stroke of the hand-lever, and as the holes in the rotary disk register in line with those in the fertilizer slide-bar the contents of the cell in each are discharged at the same time.

Figure 1 is a perspective view of the front section of a two-horse corn-planter to which my improvement is applied, the seed-box on the right being left open to exhibit its internal arrangement. Fig. 2 represents a section through line 1 2 of Fig. 1. Fig. 3 is a top view of the right end of the two slide-bars, with their forked-brace connection.

*a* is the seed hopper or box, which, in this case, is divided into two compartments, *d* and *e*, *d* being the hopper-compartment in rear of *e*, in which the fertilizer is placed. The position of these two compartments may be reversed, and the dropping devices and lever which actuates the seed-disks may be of any suitable form of construction, either a fork, as shown in Fig. 3, or of a trident shape, or with a rhomb-shaped end, such as have been used before.

As the construction of either form of slide-lever forms no part of my invention, I therefore do not claim it; but the manner of connecting a plain slide-lever having the necessary cells in it for discharging a fertilizer-dust (which is reciprocated through the box containing it) with that of an ordinary slide-lever actuating the rotary seed-disks of a planter, so as to deposit the fertilizer and seed together in the pocket *g* of the seed tube or valve *f*, and after retention to deposit them at the same time into the furrow by a single stroke of the hand-lever *b*, operating the two connected slide-levers at the same instant, is the main subject of my invention.

The manner of making the slide-bar of the fertilizer attachment in two pieces, so as to be divisible at will in order to be easily removed or replaced, forms the second part of my invention.

The slide-bar *a'*, actuating the rotary dropping-plate in compartment *e*, is rigidly connected to the slide-bar *b'*, extending through the fertilizer-compartment *d*, by the forked brace *c'*, (see Fig. 1,) the two limbs of which have their ends fastened to *a'* by bolts, while the angle end of the brace is bolted to the slide-bar *b'* in the same manner. This connection secures the two slide-bars firmly together, so that they are operated as one slide by the hand-lever *b*. The hook *k* and loop *k'* connect the two parts of the slide-lever *b'* together in the middle, and it can be easily disconnected and detached when not in use. The two pieces, *k* and *k'*, consist of two flat pieces of iron, the former having a plain hook bent downward from one end, which is hooked into a slot cut in the end of *k'*. Each is riveted upon the connecting ends of *b'*.

As the seed-dropping portion is often used in a piece of ground in a field where a portion requires fertilizing, the advantage of making the fertilizing slide-bar easily detachable is apparent.

To allow the fertilizer to drop into the mouth of the valve *f* the spout *n* is inclined from the discharge-hole of compartment *d*. Both the seed and fertilizer reach the pocket *g* at the lower end of valve *f*, and are discharged into the furrow through the open heel *i* of the furrowing-shoe together at a single stroke of the lever *b*.

Rubber pieces *r* are fitted over the slide-bar *b'* inside the fertilizer-box to prevent the dust from working out of the slide-holes.

I am aware that double hoppers with rotary and reciprocating devices for discharging the seed and fertilizer through the same spout to the furrow are not broadly new with me; but

I claim as my improvement in fertilizing attachments for corn-planters—

1. In that class of corn-planters employing rotary seed-dropping devices, the combination of a hopper having two compartments and two discharge-openings, one of which contains the seed to be planted and the other the fertilizer, two connected parallel slide-bars arranged in the same horizontal plane, and a single hand-lever for actuating the said slide-bars together, as described.

2. In a corn-planter, the combination of a hopper with a vertical partition dividing the hopper into two compartments and the two discharge-openings of the seed-tube *f*, attached to the standard *h* of the runner, fertilizer-conductor *n*, communicating with the seed-tube, the two connected parallel bars, and the hand-lever, substantially as described.

3. In a fertilizer attachment to a seed-planter, a sliding bar coupled by the connections *k* *k'*, whereby the use of the fertilizer may be discontinued by uncoupling the connection and detaching the brace without further altering the machine, substantially as described.

AUSTIN C. EVANS.

Attest:
B. C. CONVERSE,
R. A. PIERCE.